United States Patent [19]

Waldmann et al.

[11] 4,403,948
[45] Sep. 13, 1983

[54] SYSTEM FOR SEPARATION OF VOLATILE SUBSTANCES FROM WASTE GASES

[76] Inventors: Günter Waldmann, Packenreiterstr. 18b; Franz Plesch, Gotthord Str. 4, both of D-8000 Muenchen, Fed. Rep. of Germany

[21] Appl. No.: 243,335

[22] Filed: Mar. 13, 1981

[30] Foreign Application Priority Data

Mar. 14, 1980 [DE] Fed. Rep. of Germany ....... 3009938

[51] Int. Cl.³ .............................................. F26B 3/04
[52] U.S. Cl. ........................................ 432/1; 34/13.4; 34/16.5; 34/32; 34/73; 34/75; 34/79
[58] Field of Search ...................... 432/1, 72; 34/13.4, 34/16.5, 32, 40, 72, 73, 75, 79

[56] References Cited

U.S. PATENT DOCUMENTS

| | | | |
|---|---|---|---|
| 1,218,616 | 3/1917 | Baker | 34/32 |
| 1,480,804 | 1/1924 | Fish, Jr. | 34/32 X |
| 4,329,788 | 5/1982 | Sterlini | 34/32 |
| 4,339,883 | 7/1982 | Waldmann | 34/32 X |

Primary Examiner—John J. Camby
Attorney, Agent, or Firm—Michael J. Striker

[57] ABSTRACT

A process and apparatus for drying of materials such as wood chips or lacquers. A stream of hot gas is provided, the hot gas passes over the material to be dried, the now waste gas is removed from the material to be dried, the volatile substances are deposited from the waste gas and the deposited substances are moved to a collector location. Dust and similar materials can be also bonded during the depositing step. The deposited volatile substances can be removed by intermittent evaporation and/or sublimation and the volatile substances can be collected at a predetermined collector location, or by continuously washing out the volatile substances, or by compressing before cooling down and expanding after cooling down the volatile substances. Removing of deposited volatile substances may be triggered in response to a certain degree of dirtying or soiling and to passing predetermined threshold values of temperature and/or pressure and in accordance with a predetermined time plan, respectively.

54 Claims, 6 Drawing Figures

SYSTEM FOR SEPARATION OF VOLATILE SUBSTANCES FROM WASTE GASES

DESCRIPTION

BACKGROUND OF THE INVENTION

1. Field of the Invention

The present invention relates to a method and apparatus for separating of combustible and/or condensable and/or precipitable substances possibly being harmful from waste gases of drying plants.

2. Brief Description of the Background of the Invention Including Prior Art

Previously it had been found essential to cool waste gas so far until the volatile harmful substances are forced to condense and thereby deposit from the waste gas under formation of dust or the like. In the previous method and apparatus the applications were in particular but not exclusively in drying of wood chips where in addition to wood dust natural and synthetic resins and terpenes as well as water vapor are contained in the waste gas. In addition to this special application the previous process and apparatus can be also applied in such cases where similar waste gases are produced carrying comparable volatile substances such as for example in the drying of veneer, in the processing of lacquer and the like.

It is prevented by way of the method and apparatus previously found that harmful substances pass into the environment and at the same time there is a considerable saving of energy. The condensable harmful substances depositing under formation of dust or the like from the waste gas during the process of forced condensation cause the employed heat exchanger to clog up rapidly depending on the contents of dust in the waste gas. Therefore, a relatively frequent purification and cleaning of the heat exchanger is required. The previously found method and apparatus provide for cleaning by intermittently burning off the deposited substances. Apart form the fact that this method of cleaning can only be applied in cases where the deposited materials are to a large extent combustible there are considerable problems with the sealing, especially if the waste gas/volatile substances mixture has to be considered as possibly being subject to explosions. In addition, energy has to be provided for the burning off, which could be lost.

SUMMARY OF THE INVENTION

1. Objects of the Invention

It is an object of the present invention to provide a possibility for removal of deposited volatile substances, which is more advantageous in the energy balance and which is subject to less danger.

It is another object of the present invention to separate the deposited volatile substances for further use.

It is a further object of the present invention to properly control the removal of deposited volatile substances by automatic controls.

These and other objects and advantages of the present invention will become evident from the description which follows.

2. Brief Description of the Invention

The present invention provides a process for drying materials which comprises providing a stream of hot gas, passing the hot gas over the material to be dried, removing the waste gas from the material to be dried, depositing volatile substances from the waste gas and moving the deposited substances to a collector location.

Dust and/or similar materials can be bonded during the depositing step. The deposited substances can be moved by intermittent evaporation and/or sublimation and the volatile substances can then be collected at a predetermined collector location. The intermittently evaporated and/or sublimed substances can be precipitated at a collector location. A stream of hot gas can be employed for reevaporating and/or resubliming the deposited volatile substances. The intermittently evaporated and/or sublimed volatile substances can be redeposited at reuseable filters. Combustible volatile substances can be deposited at combustible filters and the filters can be reemployed for heating purposes. The waste gas stream can be interrupted for reevaporating and/or resubliming deposited volatile substances. The waste gas stream can be split up in several partial streams for cooling down, which partial streams are interrupted cyclically for reevaporation and/or resublimation of the deposited volatile substances. The waste gas purified from the volatile substances by forced condensation can be cooled to below the dew point of water. Heat exchange can be employed for cooling the waste gas. Preferably the heat exchange is performed with a stream of fresh air, which after the heat exchange is to be fed to the drying process. At least part of the purified waste gas can be fed to the drying process as an inert drying gas. The reevaporation and/or resublimation can be triggered when the difference pressure between the pressure of the waste gas containing volatile substances and the pressure of the waste gas purified from volatile substances passes a threshold value.

Upon determination of a certain level of soiling and/or dirt accumulation by deposited volatile substances the moving of the volatile substances can be triggered. The level of soiling and/or dirt accumulation can be determined optically, for example the reflectance of the surfaces for depositing volatile substances can be measured to determine the level of soiling and/or dirt accumulation.

The temperature difference $\Delta T$ of the feed $T_V$ and of the outgoing $T_N$ temperature of the heat exchange fluid providing cooling for depositing of volatile substances can be detemined and the difference $\Delta T$ can be compared with a threshold value $\Delta T_S$. If the difference $\Delta T$ falls below the threshold value $\Delta T_S$ this triggers the moving of the deposited volatile substances.

The outgoing temperature $T_N$ of the heat exchange fluid providing cooling for depositing of volatile substances can be determined and the change of the outgoing temperature $T_N$ can be compared for a defined time interval $\Delta t$. If the change in the outgoing temperature $T_N$ reaches a certain threshold value $T_{NS}$ this can trigger the moving of the deposited volatile substances. In addition, the threshold value $T_{NS}$ can be corrected based on the temperature $T_1$ of the feed temperature of the waste gas to the heat exchanger.

The deposited volatile substances can be removed continuously with a carrier liquid and preferably the deposition region for the volatile substances is kept moist. Water can be continuously fed to the deposition region for the volatile substances. The waste gas purified by forced condensation can be further cooled to below the dew point of water. The heat for depositing the volatile substances in a cooled region can be removed by exchanging heat in a heat exchanger. The heat exchange can be provided by a stream of fresh air, which is fed to the drying process after the heat is exchanged. At least part of the waste gas purified from volatile substances can be fed to the drying process as an inert gas.

Furthermore, the waste gas coming from the material to be dried can be compressed, the compressed waste gas can be cooled and the cooled compressed waste gas can be expanded and preferably is expanded to ambient pressure. The cooled compressed waste gas can be cooled and/or expanded to below the dew point of water and the cooling can be provided by heat exchange. At least part of the purified waste gas can be fed to the drying process as an inert gas.

There is also provided an apparatus for separation of carried combustible and/or condensable and/or precipitable substances from the waste gas of drying installations which comprises a supply line connected to a drying chamber for providing stock to be dried, an offtake line connected to the drying chamber for removing dried stock, an input to the drying chamber for feeding in hot air, a waste gas output of said drying chamber for removing waste gas, means for depositing volatile substances from the waste gas connected to the waste gas output and moving means for transporting the deposited volatile substances.

The means for depositing preferably comprises a first heat exchanger connected to the waste gas output of the drying chamber and having in turn a waste gas output, an input and an output connected to the first heat exchanger for passing exchange fluid providing for cooling of the waste gas coming from the drying chamber to a temperature ($T_2$) suitable for depositing volatile substances. A heating provision can be provided for evaporating and/or subliming the deposited volatile substances and a switching means can allow for alternately turning on the exchange fluid for cooling of the waste gas or the heating provision. A collector can be provided for the evaporated and/or sublimed volatile substances deposited in the heat exchanger. Continuously fed in waste gas can be cyclically passed only to a part of the heat exchange surface of the heat exchanger and the other part can be at the same time fed with hot gas for evaporating and/or subliming deposited volatile substances. A trigger mechanism can initiate the feeding of hot gas to the first heat exchanger or a respective part thereof if the pressure difference $\Delta p_i$ between the pressure of the waste gas loaded with volatile substances and the pressure of the waste gas purified from volatile substances surpasses a threshold value $\Delta p_s$. There can also be provided a trigger mechanism for initiating purification of the first heat exchanger or respectively part thereof if the pressure of the waste gas purified from volatile substances surpasses a threshold value after the first heat exchanger. A timing means can initiate the feeding of hot gas to the first heat exchanger or respectively a part thereof at defined points in time or after predetermined time intervals. The collector provision preferably comprises filters and for combustible volatile substances the filter is preferably combustible. The fluid warmed up in the first heat exchanger can be fed to the drying process and preferably is fed at least in part to the burner providing hot air to the drying process.

There can be provided a second heat exchanger cooling the waste gas free of volatile substances coming from the first heat exchanger to below the dew point of water. The fluid warmed up in the second heat exchanger can be fed to the drying chamber and/or to a burner for heating up drying gas. The heat exchanger can comprise heat pipes. There can be a means for moisturizing the heat exchange surface exposed to the waste gas continuously. The fluid heated by the first heat exchanger can be fed to the drying chamber and/or burner for providing drying air to the chamber. A second heat exchanger can cool the waste gas free of volatile substances coming from the first heat exchanger to below the dew point of water. The fluid warmed up in the second heat exchanger can be fed to the drying chamber and/or to a burner for heating up drying gas. The heat exchanger can comprise heat pipes.

In a further embodiment a compressor can be connected to the output of the drying chamber for pressurizing waste gas, a heat exchanger can be connected to the compressor for cooling the pressurized gas and a separator can be connected to the heat exchanger for separating the combustible and/or condensable and/or precipitable substances from the waste gas. Preferably, the separator is an expansion chamber. The waste gas can be compressed to about 1.8 bar, the compressed waste gas can be cooled to about 37° C. and the cooled compressed waste gas can be expanded to about 1 bar at about 5° C. The heat exchanger can be a heat exchanger employing water as a fluid for cooling the waste gas. The expansion of the pressurized and cooled waste gas can be led as to allow water to condense from the waste gas. The heat exchanger can comprise heat pipes. The fluid heated by the heat exchanger can be fed to the drying chamber and/or a burner for providing hot air to the chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the various possible embodiments of the present invention

DESCRIPTION OF INVENTION AND PREFERRED EMBODIMENTS

Figure 1:
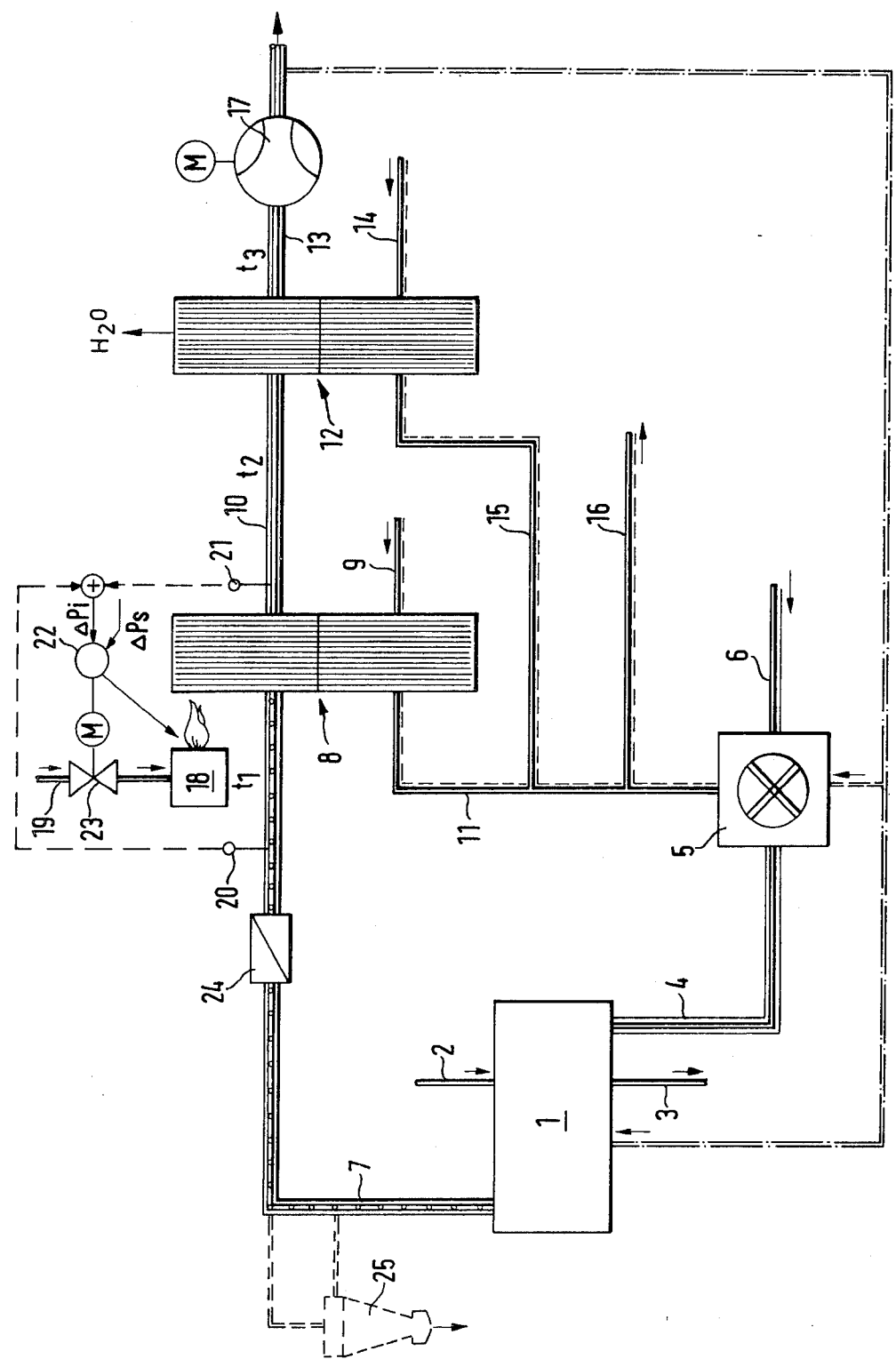
FIG. 1 shows a schematic view of an overall drying system.

In accordance with the present invention a process is provided for separating carried combustible and/or condensable and/or precipitable harmful substances in drying installations, wherein the waste gas is cooled until the harmful substances are forced to condense and deposit under formation of dust or the like in the waste gas and where the deposited harmful substances are intermittently reevaporated, transported and collected at a different location. The deposited substances can be reevaporated with a stream of hot gas and then be collected by precipitation. The precipitation can occur in filters, which are preferably combustible for combustible volatile substances and they can be broken up for reuse as heating materials. For reevaporation the waste gas stream can be interrupted or the waste gas stream can be divided into several part streams, which are cyclically alternatingly interrupted for the reevaporation step. The waste gas cleaned by forced condensation can be cooled to below the dew point of water. The cooling can be provided by heat exchange and the heat exchange can be provided by a fresh air stream, which is afterwards fed to the drying process. Reevaporation can be initiated by passing of a threshold value of the pressure difference between the waste gas containing volatile substances and the waste gas free of volatile substances.

This is achieved with an apparatus for separating carried combustible and/or condensable and/or precipitable harmful substances from waste gases of drying installations in particular in the drying of wood chips. Hot gas from a firing box supplies a drying chamber through which the materials to be dried can pass and from which the waste gas loaded with harmful substances can be removed. A first heat exchanger cools the waste gas from the drying chamber to a temperature at which the harmful substances are forced to precipitate and/or condense in the waste gas under binding of dust or the like. For purification of the first heat exchanger a hot gas circuit can be intermittently switched on in place of the waste gas and the hot gas circle comprises a collector station locally separated from the heat exchanger.

The intermittent reevaporation of the deposited harmful substances, their removal and their collecting at a different location is advantageous in particular with waste gas/harmful substances mixtures which are in danger of exploding. It is also advantageous with such harmful substances which are combustible, since the collected harmful substances can be used again as a fuel material. It is further advantageous in cases where the collected substances can be used again for some purpose or where they can be worked up for providing recycled raw materials.

A continuously present moisture film or liquid film maintained at the heat exchange surfaces has the advantage that the deposit of the harmful substances does not occur immediately at the surfaces of the heat exchanger but at the interposed liquid or moisture film. This embodiment allows for continuous operation. While in most cases water can be employed as a liquid, it may be necessary for certain harmful substances to employ other liquids not reacting with the harmful substance present.

Certain harmful substances react very sensitively to pressure changes such as for example terpenes and lacquers and solvents employed in certain lacquering operations and continuous operation is also possible in this case.

It is a feature common to all these embodiments that the deposited harmful substances can be collected and therefor possibly be reused and that the embodiments can also be applied in cases where there is a danger of explosion.

Referring now to FIG. 1 there is shown a flow diagram for a plant for drying of materials such as for example wood chips and the like. The materials to be dried are fed to the drying chamber 1 via a feed line 2 and the materials employed in the example are wood chips to be dried. The dried material is removed from the drying chamber 1 via a removal line 3. For drying hot gas is fed to the drying chamber 1 via a pipe 4. The hot gas is heated in a burner installation 5, which is fed via line 6 with fuel such as mineral oil or the like, and the gas is heated to a temperature suitable for drying the materials. The waste gas generated upon drying is removed from the drying chamber via a waste gas line 7. The waste gas has a comparatively high temperature $T_1$ and carries over harmful substances developed in the drying process. In the present embodiment the harmful substances substantially comprise larger amounts of wood dust and resins and terpenes. In general natural resins will be concerned, however to a lesser extent synthetic resins can be concerned, since waste products such as residues from particle board or the like can be recycled for resuse and are therefor also being dried.

It is in fact possible to separate the dust in the waste gas by a dust scrubber or the like from the waste gas, however resins and terpenes cannot be deposited this way and pass via a chimney into the environment and for this reason the environmental contamination is obviously very considerable at least with larger drying installations, since individual resins and terpenes have to be considered as toxic or health damaging materials.

The waste gas of the temperature $T_1$ in the waste gas line 7 is fed to a first indirect heat exchanger 8, where the heat of the waste gas is exchanged with a comparatively cold fluid such as for example fresh air, which is fed to the heat exchanger via line 9. In the first heat exchanger 8 the waste gas is cooled to a temperature $T_2$, which is clearly below the condensation point of resins and terpenes. Therefor, the resins and terpenes deposit in the first heat exchanger 8 upon passage of the waste gas through the same, and the dust carried in the gas is bonded firmly to the depositing resins and terpenes. Therefore, the waste gas leaving the first heat exchanger 8 via line 10 at a temperature $T_2$ is for practical purposes free of harmful substances. In addition, the heat released at the heat exchange in the first heat exchanger 8 is reused again by feeding the warmed up fresh air to the burner installation 5 via line 11. Thus the energy required for the generation of hot air is decreased and thereby the amount of fuel to be fed via line 6 is reduced.

It is an additional advantage that also water is removed from the waste gas. For this purpose a second heat exchanger 12 is provided to which the waste gas free of harmful substances is fed via line 10 and again an indirect heat exchange is performed preferably again employing fresh air as the fluid. The second heat exchanger is run such that the waste gas leaving the second heat exchanger 12 via a line 13 is cooled below the dew point of water or the saturation point of water and the condensed water is removed from the second heat exchanger 12. In this way not only the heat relating to the temperature difference can be recovered but also the heat of condensation. Experience show that the temperature of the waste gas coming from the second heat exchanger should preferably be below 80° C. and more preferably below 50° C. The fresh air is fed to the second heat exchanger 12 via a line 14 and is removed via a line 15 and in the embodiment shown the line 15 connects to the line 11. The recovered heat can also be used in other ways. For example it can be employed by feeding the preheated fresh air via a line 16 to other plants such as the predrying of wood or of wood chips. Instead of fresh air to one or both of the heat exchangers 8, 12 aother fluid can be fed, which also can be used in other ways. For example the warming of water for heating purposes or for public bath houses or the like is possible.

The purified and waterfree waste gas in the line 13 coming from the second heat exchanger 12 can be reused, but it can also be released via a chimney or the like into the environment. For moving the waste gas a blower 17 is provided.

In particular with the embodiment shown it has been found in wood chip drying that the part of the first heat exchanger exposed to the waste gas clogs up fast, since the dust content in the waste gas passing through line 7 is considerable and since this dust is bonded with the force condensed resins and terpenes in the first heat exchanger 8. Therefore, the first heat exchanger has to be cleaned frequently. A burn off installation 18 is provided for the removal of the deposited harmful substances in the heat exchanger. By means of the burn-off device 18, the bonded and combustible dust is burned off and the deposited resins and terpenes are removed from the heat exchange surface. For this purpose fuel such as heating oil is fed through lie 19 and a valve 23 disposed between the burn-off installation 18 and line 19 is opened when the summing member 22 generates a control signal. This control signal is generated when a first pressure sensor 20 disposed in line 7 and a second pressure sensor 21 disposed discharge line 10 give respectively signals resulting in the pressure difference signal $\Delta p_i$ passes corresponding threshold pressure difference $\Delta p_s$.

Especially in cases where several heat exchanger units are employed, which are burned off intermittently or alternately, while at the same time in other heat exchangers the forced condensation runs continuously, and in cases where the waste gas/harmful substance mixture has to be considered prone to explosion danger, then considerable sealing problems are encountered. In addition a considerable amount of energy could be lost as is required for the burning off of the harmful substances.

Figure 2:
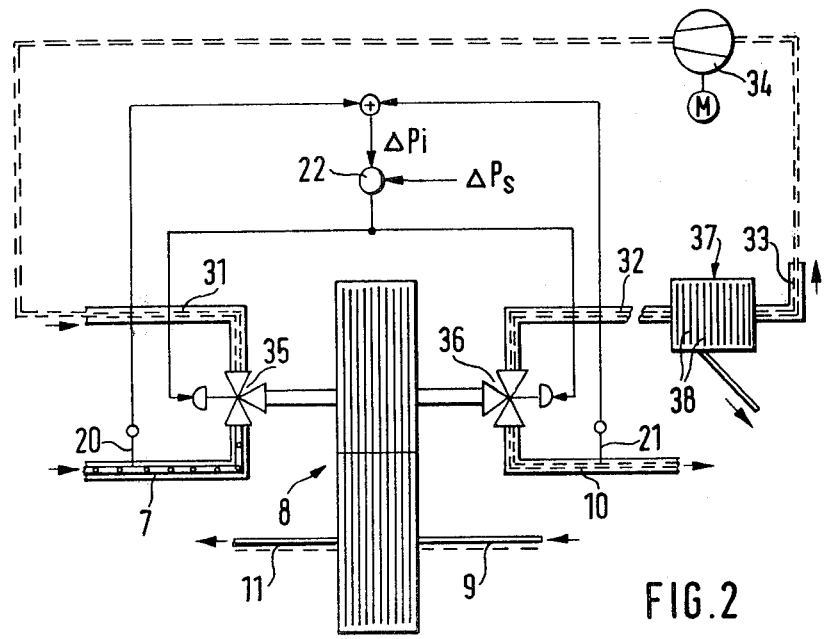
FIG. 2 shows a schematic view of an embodiment of the invention employing gas as a medium in the heat exchanger.

Referring to FIG. 2 there is shown an embodiment overcoming these problems. In this embodiment a hot gas stream via lines 31, 32, 33 is fed intermittently with the waste gas stream via lines 7, 10 into the first heat exchanger 8, and it is possible to recirculate the hot gas, as is indicated schematically, with the blower 34 for the hot gas. Two selector means 35 and 36 are also shown, which are controlled by the output signal from the summing means 22 and which open up either the passage for the waste gas or the passage for the hot gas through the first heat exchanger 8. The selector means 35 and 36 are shown only schematically as three way valves.

In case the selector means 35, 36 are set such that the passage way 31 is open through the first heat exchanger 8 to the line 32, then the hot gas reevaporates the harmful substances deposited in the first heat exchanger 8. The harmful substances are carried by the hot gas via the line 32 to a collector provision 37 wherein the reevaporated harmful substances are separated from the hot gas stream and are collected and the hot gas leaves the collector provision 37 via line 33 and free of harmful substances.

It is clear that the collector provision 37 can be disposed remote from the first heat exchanger 8 and thereby a danger of explosion can be effectively prevented. Advantageously the collection of the reevaporated harmful substances fed to the collector provision 37 is preferably performed by way of filters 38 exchangeably mounted in the collector provision 37. Depending on the harmful substance in each case also a different collector provision can be employed. Especially in the collection of wood chips, where the harmful substances comprise synthetic and natural resins and the wood dust bonded by them, it is advantageous to provide filters 38 consisting of combustible material. The filters 38 can then be removed from the collector provision 37 when they become clogged with deposited harmful substances, they can be broken up and they can be employed for heating purposes. This allows considerable savings in energy and respectively regain of energy.

The employment of selector means 35, 36 of course represents only one of various possibilities to feed intermittently on the one hand the waste gas stream and on the other hand the hot gas stream to the first heat exchanger 8. It is of course possible to part the waste gas stream into several partial waste gas streams which are changing cyclically with the hot gas stream. In addition, also a parallel or series arrangement of several heat exchanger units can be provided for the heat exchanger 8, to which cyclically changing waste gas or hot gas is fed.

While in the embodiment described the removal of the deposited harmful substances is provided by feeding in of a hot gas stream in case a threshold value is passed for the pressure difference between the harmful substances containing waste gas and the waste gas free from harmful substances, a corresponding switching can also be provided by way of a time plan with a clock unit not shown in the drawing. It is essential for such an embodiment that the harmful substances deposited in the first heat exchanger 8 are reevaporated intermittently via a hot gas stream and are removed and then spacially remote collected.

Figure 3:
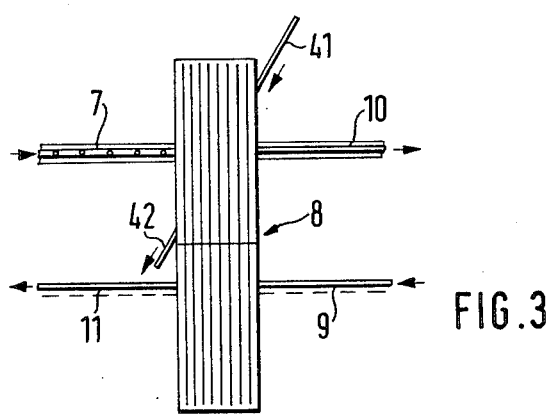
FIG. 3 shows a schematic view for an alternative embodiment to that of FIG. 2.

FIG. 3 shows an additional embodiment overcoming the above cited problem. This embodiment employs the consideration that it is not required to deposit the harmful substances directly at the heat exchange surfaces of the first heat exchanger 8, but that it is sufficient that the depositing occurs in the first heat exchanger. The deposit can also occur at a moisture or respectively liquid film covering or flowing along the heat exchange surfaces of the first heat exchanger 8. For this purpose, advantageously a suitable liquid such as in general water is fed via a line 41 to the first heat exchanger 8 continuously in order to cover the heat exchange surfaces of the first heat exchanger 8 all the time and the liquid loaded with harmful substances is removed via line 42. The liquid loaded with harmful substances and removed via line 42 can be fed to a suitable depositing provision where the harmful substances are separated from the liquid. Similar to the embodiment of FIG. 2 the harmful substances can be collected and be further used, while the liquid is possibly recycled via line 41 to the first heat exchanger 8.

Figure 4:
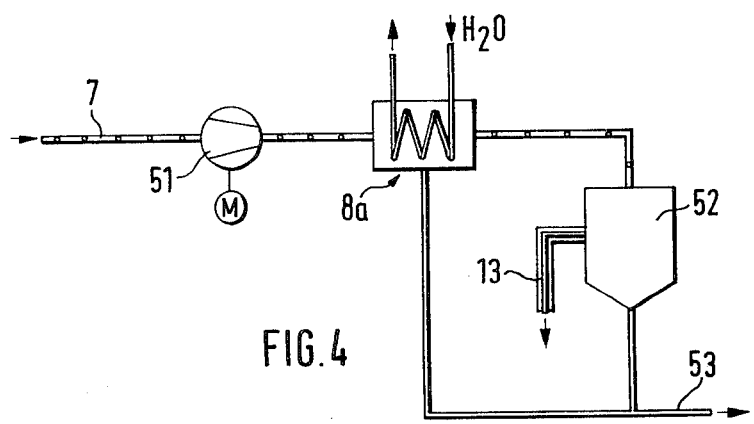
FIG. 4 shows a schematic view of an embodiment employing pressure to cause deposition of volatile substanses upon expansion.

FIG. 4 shows another embodiment employing the sensitivity of reaction of certain harmful substances to pressure differences. In this embodiment the waste gas is first fed to a compressor 51, the pressurized waste gas is fed to a heat exchanger 8a for cooling the pressurized waste gas preferably to such a degree that water condenses from the waste gas stream. The cooled, pressurized waste gas is then fed to an expansion chamber 52 wherein the harmful substances in the waste gas as far as not previously removed in the heat exchanger 8a condense by expansion and are removed via a line 53, while the waste gas free of harmful substances is removed via line 13 and further employed as is shown in FIG. 1. A water/waste gas heat exchanger is here employed as a heat exchanger, however also a different cooling medium can be employed. Furthermore in this embodiment a single heat exchanger 8a is shown, wherein the condensation of the water occurs. If desired in the output line of the waste gas from the expansion chamber 52 a second heat exchanger can be provided as is the case in the view of FIG. 1. This embodiment is useful on the one hand for the purification of the heat exchanger in case terpenes are in the waste gas and on the other hand also with lacquer processing plants, especially varnish drying plants.

In one embodiment the harmful substances containing waste gas of about 92° C. is pressurized in the compressor 51 to 1.8 bar at a temperature of 187° C. The waste gas is then cooled in the heat exchanger 8a to about 37° C. under a minor pressure loss of about 0.1 bar. The cooling medium warmed up by the heat exchange can be further used. Already during this cooling one can expect the condensation of both harmful substances such as solvents and water. The harmful substances containing waste gas is then expanded to ambient pressure, which is accompanied by a further cooling to about 5° C. During this stage the water and the harmful substances are condensed to a large extent.

It is a feature of the embodiments of FIGS. 3 and 4 to allow for continuous operation even with a single heat exchanger unit. The selection of an embodiment for an individual case depends of course on the kind of the harmful substances, on the amount of energy to be applied and possibly to be recovered as well as on technological requirements such as for example space needs and the like.

It is particularly advantageous to employ heat exchangers constructed with heat pipes (such as for example those provided by the Q-DOT Company, Dallas, Texas) as are for example described in German Patent application P 29 20 577.4. Such a heat exchanger allows a high efficiency in the heat exchange with a relatively small size and such a heat exchanger can be highly loaded.

As shown in the drying installation according to FIG. 1 at least a part of the waste gas free of harmful substances and after removal of water can be fed at a temperature $T_3$ in the line 13 as shown with dash-dotted lines in FIG. 1 either to the burner installation 5 or to the drying chamber 1 as an inert gas having a low content in oxygen. Finally and in particular in cases where the dust content of the waste gas is very high as is shown with dashed lines in FIG. 1 the waste gas from the drying chamber can be fed to a cyclone separator 25 before the temperature decrease that is before the condensation of the harmful substances. This allows to extend the cycle time for the removal of deposited substances from the waste gas in the heat exchanger 8.

It is to be mentioned that in cases where fresh air is employed as a heat exchange medium the exit temperatures $T_2$ and $T_3$ at the heat exchangers 8, 12 depend on the ambient temperature in each case, therefor the heat exchangers 8, 12, 8a are to be provided as required for the most unfavorable case (high ambient temperature with low temperature of the waste gas).

The method described above employing the pressure difference for triggering or respectively control of the cleaning of the heat exchanger may not always be satisfactory, since the pressure drop over extended times can be very small, however can suddenly rise exponentially and thus a safe operation may not be always asssured and furthermore the threshold triggering the cleaning operation may be very difficult to reproduce in particular when located in the range of the slow rising slope of the pressure characteristic curve.

Figure 5:
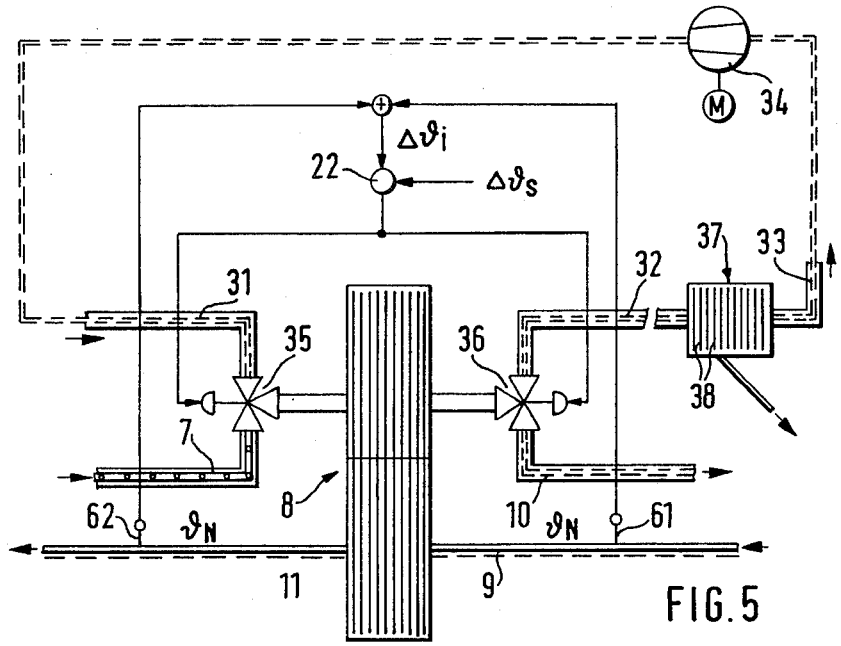
FIG. 5 shows a view of an additional embodiment for controlling the purification of the waste gas.

There is shown in FIG. 5 an embodiment overcoming this problem. The pressure difference is not employed in this embodiment, but a temperature difference is employed and in particular the difference of the temperature $T_V$ of the fluid streaming into the heat exchanger 8 through line 9 and the temperature $T_N$ of the fluid flowing out of the heat exchanger 8 through the line 11. If this temperature difference is below the set point value $\Delta T_S$ this means that the part of the heat exchanger passed by the waste gas to be cleaned is clogged to a considerable extent and therefor has to be cleaned.

For this purpose a temperature sensor 61 is disposed in line 9 and a temperature sensor 62 is disposed in line 11 and their output signals are subtracted to form the actual temperature difference $\Delta T_i$ and the actual temperature difference $\Delta T_i$ is compared with the set point temperature difference $\Delta T_S$ in a comparator.

Figure 6:
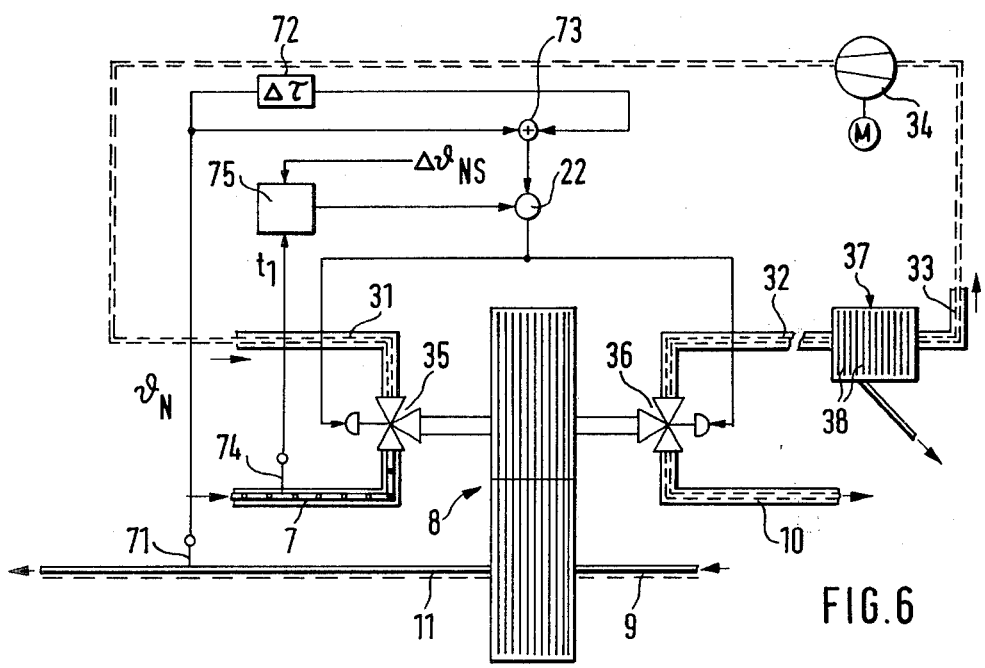
FIG. 6 shows a schematic view of an embodiment providing for alternative control of the purification.

A further embodiment is shown in FIG. 6 where it is considered that the temperature $T_N$ of the fluid flowing from the heat exchanger 8 through the line 11 has to be regarded as constant over large time extensions. With increasing clogging of the heat exchanger 8 this temperature $T_N$ slowly drops and upon a certain temperature drop a cleaning step is triggered. For this purpose a temperature sensor 71 is provided in the line 11 and its output signal is on the one hand undelayed and on the other hand delayed by way of a delay circuit 72 fed to a subtraction circuit 73 and then in the comparison circuit 22 the result is compared to the threshold value $\Delta T_{NS}$ of this time dependent temperature drop. It is also observable that this temperature drop depends also on the feed temperature $T_1$ of the waste gas containing harmful substances. Therefor a temperature sensor 74 is provided for the temperature $T_1$ in the line 7 and its output signal for the determination of the threshold value of the externally entered allowable temperature difference value is entered as a correction into the balancing circuit 75 such that independent from the actual temperature of the soiled and dirt containing waste gas the threshold value triggering the cleaning step is adjusted.

Finally the cleaning cannot only be triggered by the previously described physical determinable values or by a time plan. There is also the possibility to measure the dirt and soil accumulation in the heat exchanger directly, for example by way of optical systems, in order to trigger cleaning upon a certain degree of dirt accumulation. For example the reflection behavior of clean and dirty heat exchanger surfaces is very different.

It will be understood that each of the elements described above, or two or more together, may also find a useful application in other types of system configurations and waste gas processing procedures differing from the types described above.

While the invention has been illustrated and described as embodied in the context of a drying plant for wood chips, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. An apparatus for separation of carried combustible and/or condensable and/or precipitable substances from the waste gas of drying installations comprising a drying chamber; a supply line to the drying chamber for feeding material to be dried; an offtake line connected to the drying chamber for removing dried stock; an input line to said drying chamber for feeding in hot air; a waste has output line connectedd to said drying chamber for removing waste gas; a first heat exchanger connected to the waste gas output line and having a waste gas outlet; an inlet and an outlet for exchange fluid; said first heat exchanger providing for cooling of the hot waste gas coming from the drying chamber to a temperature sufficient for depositing volatile substances; heating means for evaporating and/or subliming the deposited volatile substances; and switching means to allow for alternately turning on the exchange fluid for cooling of the waste gas or the heating means.

2. The apparatus for separation according to claim 1 further comprising a collector provision for the evaporated and/or sublimed volatile substances deposited in the heat exchanger.

3. The process for drying materials in the apparatus for separation according to claim 2 wherein the continuously fed in waste gas is cyclically fed only to a part of the heat exchange surface of the heat exchanger and the other part is at the same time fed with hot gas for evaporating and/or subliming deposited volatile substances.

4. The apparatus according to claim 2 further comprising trigger mechanism for initiating the feeding of hot gas to the first heat exchanger or a respective part thereof if the pressure difference $\Delta p_i$ between the pressure of the waste gas loaded with volatile substances and the pressure of the waste gas purified from volatile substances surpasses a threshold value $\Delta p_s$.

5. The apparatus for separation according to claim 2 further comprising trigger mechanism for initiating purification of the first heat exchanger or respectively a part thereof if the pressure of the waste gas purified from volatile substances surpasses a threshold value after the first heat exchanger.

6. The apparatus for separation according to claim 2 further comprising timing means initiating the feeding of hot gas to the first heat exchanger or respectively a part thereof at defined points in time or after predetermined time intervals.

7. The apparatus for separation according to claim 2 wherein the collector provision comprises filters.

8. The apparatus for separation according to claim 7 wherein for combustible volatile substances the filter is combustible.

9. The apparatus for separation according to claim 2 wherein the fluid warmed up in the first heat exchanger can be fed to the drying process.

10. The apparatus for separation according to claim 9 wherein the fluid warmed up in the first heat exchanger is fed at least in part to a burner providing hot air to the drying process.

11. The apparatus for separation according to claim 2 further comprising a second heat exchanger cooling the waste gas free of volatile substances coming from the first heat exchanger to below the dew point of water.

12. The process for drying materials in the apparatus for separation according to claim 11 wherein the fluid warmed up in the second heat exchanger is fed to the drying chamber and/or to a burner for heating up drying gas.

13. The apparatus for separation according to claim 2 wherein the heat exchanger is a heat exchanger comprising heat tubes.

14. The apparatus for separation according to claim 1 further comprising means for moisturizing the heat exchange surface facing the waste gas continuously.

15. The apparatus for separation according to claim 14 wherein the fluid heated by the first heat exchanger can be fed to the drying chamber and/or a burner for providing drying air to the chamber.

16. The apparatus for separation according to claim 14 further comprising a second heat exchanger cooling the waste gas free of volatile substances coming from the first heat exchanger to below the dew point of water.

17. The apparatus for separation according to claim 16 wherein the fluid warmed up in the second heat exchanger is fed to the drying chamber and/or to a burner for heating up drying gas.

18. The apparatus for separation according to claim 14 wherein the heat exchanger is a heat exchanger comprising heat pipes.

19. The apparatus for separation according to claim 1 further comprising
   a compressor connected to the output of the drying chamber for pressurizing waste gas;
   a heat exchanger connected to the compressor for cooling the pressurized gas;
   a separator connected to the heat exchanger for separating the combustible and/or condensable and/or precipitable substances from the waste gas.

20. The apparatus for separation according to claim 19 wherein the separator is an expansion chamber.

21. The apparatus for separation according to claim 20 wherin the waste gas is compressed to about 1.8 bar, wherein the compressed waste gas is cooled to about 37° C. and wherein the cooled compressed waste gas is expanded to about 1 bar at about 5° C.

22. The apparatus for separation according to claim 19 wherein the heat exchanger is a heat exchanger employing water as a fluid for cooling the waste gas.

23. The apparatus for separation according to claim 19 wherein the expansion is led such that also water condenses from the waste gas.

24. The apparatus for separation according to claim 19 wherein the heat exchanger is a heat exchanger comprising heat pipes.

25. A process for drying materials in the apparatus for separation according to claim 1, comprising the steps of heating the exchange fluid in the first heat exchanger, and then feeding the heated exchange fluid to the drying chamber and/or a burner for providing drying air to the chamber.

26. A process for drying materials in the apparatus for separation according to claim 1, comprising the steps of providing a stream of hot gas; passing the hot gas over the material to be dried; entraining waste from the material being dried in the hot gas stream and removing the resulting waste gas; depositing volatile substances from the waste gas; bonding dust and/or similar materials on the deposited volatile substances during the depositing step by intermittent evaporation and/or sublimination; and applying a stream of hot gas for reevaporating and/or resubliming the precipitated volatile substances.

27. The process according to claim 26 further comprising redepositing the intermittently evaporated and/or sublimed volatile substances at reuseable filters.

28. The process according to claim 27 wherein combustible substances are deposited on combustible filters and wherein these filters are reemployed for heating purposes.

29. The process according to claim 26 wherein the waste gas stream is interrupted for reevaporating and/or resubliming deposited volatile substances.

30. The process according to claim 26 wherein the waste gas stream is split up in several partial streams for cooling down, which are interrupted cyclically interchanging for reevaporation and/or resublimation of the deposited volatile substances.

31. The process according to claim 26 further comprising cooling the waste gas purified from the volatile substances by forced condensation to below the dew point of water.

32. The process according to claim 26 further comprising employing heat exchange for cooling the waste gas.

33. The process according to claim 32 wherein the heat exchange is performed with a stream of fresh air to be fed after the heat exchange to the drying process.

34. The process according to claim 32 wherein at least part of the purified waste gas is fed to the drying process as an inert gas.

35. The process according to claim 32 further comprising triggering reevaporation and/or resublimation upon exceeding of a threshold value of the difference pressure between the volatile substances containing waste gas and the waste gas purified from volatile substances.

36. The process according to claim 26 further comprising triggering the moving of the deposited volatile substances upon determination of a certain level of soiling and/or dirt accumulation.

37. The process according to claim 36 wherein the level of soiling and/or dirt accumulation is determined optically.

38. The process according to claim 37 further comprising measuring the reflectance of the surfaces for redepositing volatile substances for determining the level of soiling and/or dirt accumulation.

39. The process according to claim 26 further comprising determining the difference $\Delta T$ of the feed $T_V$ and of the outgoing $T_N$ temperature of a heat exchange fluid providing cooling for depositing of volatile substances; comparing the difference $\Delta T$ with a threshold value $\Delta T_S$; and triggering the moving of the deposited volatile substances if the difference $\Delta T$ falls below the threshold value $\Delta T_S$.

40. The process according to claim 26 further comprising
determining the outgoing temperature $T_N$ of a heat exchange fluid providing cooling for depositing of volatile substances;
comparing the change of the outgoing temperature $T_N$ over a defined time interval $\Delta t$; and
triggering the moving of the deposited volatile substances if the change in the outgoing temperature $T_N$ reaches a certain threshold value $T_{NS}$.

41. The process according to claim 40 further comprising correcting the threshold value $T_{NS}$ based on the temperature $T_1$ of the feed temperature of the waste gas to the heat exchanger.

42. The process according to claim 26 further comprising continuously removing the deposited volatile substances with a carrier liquid.

43. The process according to claim 42 wherein the deposition region for the volatile substances is kept moist.

44. The process according to claim 43 wherein continuously water is fed to the deposition region for the volatile substances.

45. The process according to claim 42 wherein the waste gas purified by forced condensation is further cooled to below the dew point of water.

46. The process according to claim 42 further comprising exchanging heat for depositing the volatile substances in cooled region.

47. The process according to claim 46 wherein the heat exchange is provided by a stream of fresh air fed after the heat exchange to the drying process.

48. The process according to claim 42 wherein at least part of the purified waste gas is fed to the drying process as an inert gas.

49. The process according to claim 26 further comprising
compressing the waste gas coming from the material to be dried;
cooling the compressed waste gas; and
expanding the cooled compressed waste gas.

50. The process according to claim 49 wherein the waste gas is expanded to ambient pressure.

51. The process according to claim 49 wherein the cooled compressed waste gas is cooled and/or expanded to below the dew point of water.

52. The process according to claim 49 wherein the cooling is provided by heat exchange.

53. The process according to claim 49 wherein at least part of the purified waste gas is fed to the drying process as an inert gas.

54. The process according to claim 26 further comprising the step of precipitating the intermittently evaporated and/or sublimed substances at a collector location.

* * * * *